(12) United States Patent
Sakakibara et al.

(10) Patent No.: US 12,227,852 B2
(45) Date of Patent: Feb. 18, 2025

(54) RUSTPROOFED METAL MEMBER AND COATING PAINT

(71) Applicant: TOGO SEISAKUSYO CORPORATION, Aichi-gun (JP)

(72) Inventors: Kazutoshi Sakakibara, Aichi-gun (JP); Yasutaka Hasegawa, Nagoya (JP)

(73) Assignee: TOGO SEISAKUSYO CORPORATION, Aichi-gun (JP)

( * ) Notice: Subject to any disclaimer, the term of this patent is extended or adjusted under 35 U.S.C. 154(b) by 839 days.

(21) Appl. No.: 16/958,827

(22) PCT Filed: Oct. 2, 2018

(86) PCT No.: PCT/JP2018/036885
§ 371 (c)(1),
(2) Date: Jun. 29, 2020

(87) PCT Pub. No.: WO2019/146163
PCT Pub. Date: Aug. 1, 2019

(65) Prior Publication Data
US 2021/0071013 A1   Mar. 11, 2021

(30) Foreign Application Priority Data
Jan. 29, 2018   (JP) .................................. 2018-013096

(51) Int. Cl.
| | | |
|---|---|---|
| C23C 28/00 | (2006.01) | |
| B22F 1/00 | (2022.01) | |
| B22F 1/103 | (2022.01) | |
| B32B 15/08 | (2006.01) | |
| C08K 3/08 | (2006.01) | |
| C08K 5/3447 | (2006.01) | |
| C09D 5/08 | (2006.01) | |
| C09D 7/20 | (2018.01) | |
| C09D 7/61 | (2018.01) | |
| C09D 163/00 | (2006.01) | |

(52) U.S. Cl.
CPC .............. *C23C 28/00* (2013.01); *B22F 1/00* (2013.01); *B32B 15/08* (2013.01); *C08K 5/3447* (2013.01); *C09D 5/084* (2013.01); *C09D 7/20* (2018.01); *C09D 7/61* (2018.01); *C09D 163/00* (2013.01); *B22F 1/103* (2022.01); *B22F 2301/30* (2013.01); *B22F 2303/40* (2013.01); *C08K 2003/0812* (2013.01)

(58) Field of Classification Search
CPC ............ C09D 163/00–10; C09D 5/082; C09D 5/08–086; C08K 2003/0812; B32B 15/08–098
See application file for complete search history.

(56) References Cited

U.S. PATENT DOCUMENTS

| | | | |
|---|---|---|---|
| 4,005,254 A * | 1/1977 | MacKenzie, Jr. | ..... C08F 255/02 174/110 PM |
| 4,190,686 A | 2/1980 | Muis | |
| 4,863,516 A | 9/1989 | Mosser et al. | |
| 5,066,540 A | 11/1991 | Mosser et al. | |
| 6,335,057 B1 * | 1/2002 | Noura | .............. B05D 5/068 427/380 |
| 6,872,767 B1 | 3/2005 | Lefave | |
| 7,166,330 B2 | 1/2007 | Takahashi et al. | |
| 2002/0006996 A1 * | 1/2002 | Lane | .................. C08G 18/4684 524/441 |
| 2004/0249044 A1 | 12/2004 | Nguyenquang et al. | |
| 2004/0265092 A1 | 12/2004 | Lat et al. | |
| 2005/0037146 A1 | 2/2005 | Lefave | |
| 2006/0057363 A1 | 3/2006 | Takahashi et al. | |
| 2009/0017315 A1 | 1/2009 | Hamilton et al. | |
| 2009/0068493 A1 * | 3/2009 | Sakakibara | ............ C09D 5/084 428/626 |
| 2013/0143032 A1 | 6/2013 | Iijima et al. | |
| 2013/0261270 A1 * | 10/2013 | Butikofer | ............... C08G 18/06 525/473 |

FOREIGN PATENT DOCUMENTS

| | | | |
|---|---|---|---|
| CN | 1938107 A | 3/2007 | |
| CN | 101351517 A | 1/2009 | |
| EP | 0 810 297 A1 | 12/1997 | |
| GB | 2230974 A * | 11/1990 | ............... B05D 7/51 |
| JP | 6-1 46005 A | 5/1994 | |
| JP | 9-317832 A | 12/1997 | |
| JP | 2002-53837 A | 2/2002 | |
| JP | 2004-356328 A | 12/2004 | |
| JP | 2009-522388 A | 6/2009 | |
| JP | 4350182 B2 * | 10/2009 | |
| KR | 20080062296 A * | 7/2008 | |

OTHER PUBLICATIONS

Partial machine translation of JP-4350182-B2 (2009).*
Partial machine translation of KR-20080062296-A (Year: 2008).*
International Search Report issued Dec. 4, 2018 in PCT/JP2018/036885 filed on Oct. 2, 2018, 2 pages.
Extended European Search Report issued Oct. 25, 2021 in European Patent Application No. 18901892.2, 9 pages.
Combined Chinese Office Action and Search Report issued Jan. 4, 2022 in Patent Application No. 201880087834.7 (with English machine translation and English translation of Category of Cited Documents), 24 pages.

* cited by examiner

*Primary Examiner* — Kregg T Brooks
(74) *Attorney, Agent, or Firm* — Oblon, McClelland, Maier & Neustadt, L.L.P.

(57) ABSTRACT

A rustproofed metal member of a metal member having a predetermined shape, a zinc composite film formed on a surface of the metal member, and a coating film formed by applying and drying a coating paint on the zinc composite film. The coating paint includes a coating base containing an organic solvent and a resin material dissolved in the organic solvent, and an extender pigment and an antirust pigment dispersed and retained in the coating base. The antirust pigment includes aluminum flakes having been subjected to no leafing process.

18 Claims, 1 Drawing Sheet

RUSTPROOFED METAL MEMBER AND COATING PAINT

TECHNICAL FIELD

The present invention relates to a rustproofed metal member having a zinc composite film and a coating film formed on a surface of the metal member, and a coating paint for rustproofing.

BACKGROUND ART

A technique for rustproofing a metal member by forming a zinc composite film on the surface of the metal member has been conventionally known. The antirust effect (sacrificial anticorrosive effect) of zinc contained in the zinc composite film inhibits generation of rust on the metal member having been subjected to this type of rustproofing treatment. Also, a technique of maintaining the antirust effect of the zinc composite film for a long time by forming a coating film on the zinc composite film has been proposed (for example, see Patent Literature 1).

Patent Literature 1 discloses a technique in which a zinc composite film is formed by subjecting a surface of a plated metal member to metal powder-chromium oxide treatment (so-called DACROTIZED (registered trademark)), and a coating film that contains, as a main component, a water-based treatment liquid containing a water-based resin and a silica material is further formed on the zinc composite film. According to the technique disclosed in Patent Literature 1, since the zinc composite film and the metal member are isolated from the outside by the coating film, the antirust effect of the zinc composite film is maintained for a relatively long time. Also, since the coating film contains a resin material, there is a possibility that the coating film deforms so as to follow the elastic deformation of the metal member. Therefore, for example, also when a hose clamp, spring, or the like is used as the metal member, there is a possibility that the metal member and the zinc composite film are isolated from the outside.

However, in the technique disclosed in Patent Literature 1, control of the viscosity of the coating paint is difficult, and thinning of the coating film is difficult. The coating film has, for example, white, black, or transparent color depending on the color of the extender pigment. Therefore, when a part of the coating film is lost by chipping, cracking, peeling, or the like, and the zinc composite film is exposed, the silver color of the zinc composite film in the exposed part appears prominent in contrast to the color of the extender pigment of the coating film around the exposed part in some cases.

Patent Literature 2 discloses a technique in which a zinc microparticles-dispersed resin film is formed on the surface of a rare-earth-based permanent magnet, and an aluminum microparticles-dispersed resin film is further formed on the surface of the zinc microparticles-dispersed resin film so as to provide a corrosion-resistant rare-earth-based permanent magnet in which generation of white rust is reduced while the sacrificial anticorrosive effect of zinc that is potentially base is utilized. According to the technique disclosed in Patent Literature 2, the aluminum microparticles-dispersed resin film as the upper layer exerts excellent corrosion resistance, and the zinc microparticles-dispersed resin film as the lower layer inhibits corrosion of the magnet body by the sacrificial corrosion. In the corrosion resistant rare-earth-based permanent magnet disclosed in Patent Literature 2, the problem that white rust is generated by the sacrificial anticorrosive effect of zinc is small because the zinc microparticles-dispersed resin film is not in an environment where the film comes into contact with a large amount of a corrosive component.

However, in Patent Literature 2, the object to be rustproofed is limited to the rare-earth permanent magnet only, and there is no description and suggestion for application to other metal members including an elastic material. As a matter of course, a case where the coating film is partially lost by chipping, cracking, peeling, or the like which often occurs depending on the application of the product is not considered. In Patent Literature 2, only white rust generated by sacrificial corrosion of zinc in the zinc microparticles-dispersed resin film is regarded as a problem from the viewpoint of improvement in appearance. In a wide range of applications including machine parts and the like, prevention of red rust of a metal member is more important than prevention of white rust since the red rust exerts an influences even on the mechanical strength of the whole product. However, Patent Literature 2 lacks description about red rust. Therefore, in the conventional art, excellent antirust performance is difficult to impart to a rustproofed metal member.

CITATION LIST

Patent Literature

Patent Literature 1: JP H06-146005 (A)
Patent Literature 2: JP 2004-356328 (A)

SUMMARY OF INVENTION

Technical Problem

The present invention has been made in view of the aforementioned circumstances, and an object of the present invention is to provide a rustproofed metal member that allows improvement of the performance of a protective coating film formed thinly on a zinc composite film having sacrificial anticorrosive effect and thus inhibits appearance from becoming poor due to partial loss of the coating film, allows the sacrificial anticorrosive effect of zinc to be exerted better than ever before, and has excellent antirust performance particularly against red rust.

Solution to Problem

A rustproofed metal member according to the present invention for solving the aforementioned problem includes:
  a metal member having a predetermined shape,
  a zinc composite film formed on a surface of the metal member, and
  a coating film formed by applying and drying a coating paint on the zinc composite film,
  the coating paint includes a coating base containing an organic solvent and a resin material dissolved in the organic solvent, and an extender pigment and an antirust pigment dispersed and retained in the coating base, and
  the antirust pigment includes aluminum flakes having been subjected to no leafing process.

A coating paint according to the present invention for solving the aforementioned problem is directed to:
  a coating paint that is used for rustproofing and applied and dried on a zinc composite film to form a coating film, and the coating paint includes a coating base containing an organic solvent and a resin material dissolved in the organic solvent, and an extender pigment and an antirust pigment dispersed and retained in the coating base, and the antirust pigment including aluminum flakes having been subjected to no leafing process.

Advantageous Effects of Invention

The present invention provides a rustproofed metal member that allows improvement of the performance of a coating film formed thinly on a zinc composite film having sacrificial anticorrosive effect and thus inhibits appearance from becoming poor due to partial loss of the coating film, allows the sacrificial anticorrosive effect of zinc to be exerted better than ever before, and has excellent antirust performance particularly against red rust.

DESCRIPTION OF EMBODIMENTS

Figure 1:
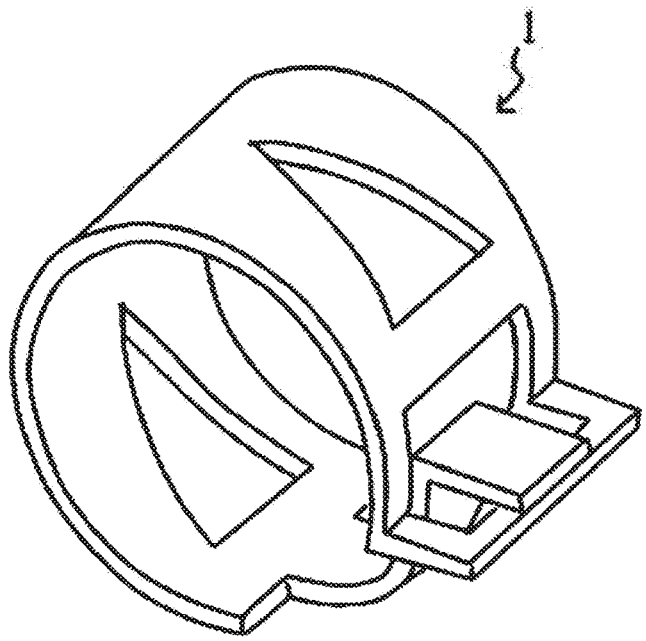
FIG. 1 is a perspective view schematically showing a rustproofed metal member in Production Example 1.

The following describes preferred embodiments of the present invention. Unless mentioned otherwise in particular, a numerical value range of "x to y" in the description herein includes, in the range thereof, a lower limit "x" and an upper limit "y". A numerical value range is formed by arbitrarily combining such upper limit values, lower limit values, and numerical values described in Examples. In addition, numerical values arbitrarily selected within a numerical value range is newly used as upper limit and lower limit numerical values.

The rustproofed metal member (hereinafter, abbreviated as a rustproof metal member as appropriate) of the present invention has a metal member having a predetermined shape, a zinc composite film formed on the metal member, and a coating film obtained by applying and drying a coating paint on the zinc composite film.

The coating film in the rustproof metal member of the present invention exerts especially excellent antirust performance when the present invention is applied to a metal member (for example, hose clamp, spring, and the like) in which chipping, cracking, or peeling of the film is likely to occur due to elastic deformation at the time of use. However, as the metal member in the rustproof metal member of the present invention, a metal member (for example, bolt and the like) that does not elastically deform at the time of use is used depending on the request for rustproofing.

In the rustproof metal member of the present invention, the metal member has a predetermined shape. The predetermined shape of the metal member in the description herein does not indicate a specific shape, but is represented as a concept comprehensively including shapes of various parts which are required to be rustproofed in various industrial fields, such as a clip shape, a spring shape, a plate shape, a bolt, and a hose clamp.

As the zinc composite film according to the present invention, a standard film containing zinc is used. Examples of the standard film in which flaky or particulate zinc powder is bound with an organic or inorganic binder include zinc composite films obtained by treatment with an existing treatment method such as DACROTIZED (registered trademark), GEOMET (registered trademark), ZINTEK (registered trademark), and LAFRE (registered trademark) treatments. These zinc composite films are preferably used because of the excellent antirust performance.

The coating film according to the present invention is formed by applying and drying a coating paint consisted of specific components. The coating paint that forms the coating film includes a coating base, and an extender pigment and an antirust pigment dispersed and retained in the coating base. The coating base contains an organic solvent and a resin material dissolved in the organic solvent.

That is, the coating paint according to the present invention includes an antirust pigment, an extender pigment, a resin material, and an organic solvent as components (namely, a lacquer-based material). The organic solvent functions as a medium (namely, solvent) for dissolving the resin material. Therefore, in the rustproof metal member of the present invention, the viscosity of the coating paint is easily controlled, and the coating film is thinned while the antirust performance is maintained.

Using aluminum flakes having been subjected to no leafing process, for the antirust pigment for the coating paint, is also a significant feature. In general, the leafing process is a surface treatment that is widely used for metal pigments such as aluminum, and aims at floating metal pigment particles dispersed in the paint by surface tension to arrange and orient the metal pigment particles on the coating surface, by coating the surface of the metal pigment particles with a stearate or the like. The leafing process is conducted mainly on flaky (leaf, lamina, scale-like) particles having coatability for enhancing the coatability. Therefore, the flaky metal pigment having been subjected to the leafing process has further enhanced coatability, and efficiently improves the appearance such as reflectance with a minimum blending amount. Therefore, such flaky metal pigment is generally used as a pigment in a metallic-colored paint.

Meanwhile, the aluminum flakes used in the present invention are laminar, leafy, or scaly flakes, and are aluminum pigment having been subjected to no leafing process. Aluminum flakes having been subjected to no leafing process are commercially available as non-leafing aluminum flakes or non-leafed aluminum flakes in general. Hereinafter, aluminum flakes having been subjected to no leafing process are called non-leafing aluminum flakes as appropriate. The non-leafing aluminum flakes are blended as apart of the antirust pigment in the present invention. Non-leafing aluminum flakes are not affected by the orientation effect on the coating surface due to the surface tension, and arranged in random directions in the paint. Therefore, the non-leafing aluminum flakes penetrate the coating film after drying.

Further, the non-leafing aluminum flakes used in the present invention also serve as a coloring pigment. That is, by blending the non-leafing aluminum flakes, the coating film in the present invention has a metallic color, which is a color similar to the color of the zinc composite film on the lower layer. Accordingly, even when only the coating film is partly deficient, and the zinc composite film on the lower layer is exposed, the exposed zinc composite film and the surrounding coating film have consistency in appearance, and thus the deficiency in the coating film is less likely to appear prominent.

Also, when only the coating film is partly deficient, the zinc composite film is exposed, so that sacrificial anticorrosive effect of zinc against progression of rusting by water and salt in the air begins at that point of time. (The zinc composite film on the lower layer contains sacrificially corrosive metal other than zinc, or electrically base metal, and in such a case, the metal also functions in the same manner as zinc. In the description herein, zinc that is a main component of the zinc composite film on the lower layer will be described as an example.) Here, in a standard zinc composite film having a coating film, only metal zinc in the part (namely, coming into contact with the outside by chipping, cracking, peeling, or the like) which is not coated with the coating film is used for sacrificial corrosion. After the partly exposed metal zinc has been completely consumed for sacrificial corrosion, there is a high possibility that rusting further progresses up to the underlying metal member.

However, in the coating film of the present invention, the non-leafing aluminum flakes are not arranged in a parallel manner on the film surface, and in a preferred mode, most of the non-leafing aluminum flakes exists so as to penetrate the coating film. Since an interface exists between the particle surface of non-leafing aluminum flakes penetrating the coating film, and the resin base, passage of a small amount of water or the like is facilitated as compared with the leafing aluminum flakes that are arranged in a parallel manner on the film surface. Therefore, the penetrating non-leafing aluminum flakes themselves contribute to the sacrificial corrosion. Hence, the non-leafing aluminum flakes of the present invention form a part of the antirust pigment.

Moreover, in the present invention, the interface between the zinc composite film and the coating film is considered to also allow passage of water and an electric current due to the existence of the penetrating non-leafing aluminum flakes. Therefore, even metal zinc whose surface is coated with the coating film (namely, even in the state where no partial chipping or the like is in the coating film on the upper layer, and metal zinc in the zinc composite film on the lower layer is not directly exposed to the outside) contributes to the sacrificial corrosion through the interface between the zinc composite film and the coating film, or through the interface between the particle surface of the non-leafing aluminum flakes and the resin base. That is, focusing on zinc, the zinc contributes to sacrificial corrosion not only in the case where chipping or the like of the coating film occurs directly above the zinc and in the neighborhood thereof, but also in the case where such chipping occurs in the peripheral part distant from the zinc. Focusing on chipping or the like, a larger amount of zinc than before is used for sacrificial corrosion for each lost area of the coating film.

Therefore, even when the range of the chipping, cracking, or peeling in the coating film is relatively small, the sacrificial anticorrosive effect lasts as long as metal zinc is present in the coating film on the lower layer in the vicinity of the chipping portion or the like. In the coating film of the coating paint of the present invention, the sacrificial anticorrosive effect by zinc is obtained in a relatively wide range even in the presence of small chipping, cracking, or peeling, as compared with a coating of a conventional coating paint, and the antirust performance is high intrinsically in that progression of rusting into the final metal member body, and the resulting deterioration in physical properties of the metal member are suppressed.

The appearance of the rustproof metal member of the present invention has silver color which is the same color as the zinc composite film. The rustproof metal member of the present invention has excellent appearance at scratch as well as corrosion resistance at scratch.

The non-leafing aluminum flakes that are used in the present invention are commercially available, for example, non-leafing aluminum paste that is available from Toyo Aluminium K.K. is used.

The non-leafing aluminum flakes preferably have a mean particle size that is larger than or equal to the coating thickness formed by one-time application of the coating film to penetrate the coating film. The coating film on the zinc composite film in the present invention is formed by one-time application or two-time applications from the viewpoint of the balance of the uniformity of the coating and the application cost. The two-time applications are sufficiently performed by adjusting the size such that the blended non-leafing aluminum flakes have a mean particle size exceeding the dry film thickness corresponding to the one-time application in each application. In other words, a value of the mean particle size D50 of the non-leafing aluminum flakes is preferably greater than or equal to ½ of the average thickness of the coating film. The mean particle size D50 of the non-leafing aluminum flakes is measured as a mass cumulative particle diameter by a laser diffraction/scattering type particle size distribution measuring method. The hypothesis of the mechanism of obtaining the same antirust effect as that in the one-time application, in the two-time applications, will be described with reference to drawings after description of Examples.

Referring to Examples, antirust function was exerted to such a degree that the non-leafing aluminum flakes were considered to penetrate the coating film by using commercially available non-leafing aluminum flakes having a mean particle size D50 of 6 μm even when two-time applications were conducted such that the coating dry thickness was 5 μm per one application and the total dry thickness was 10 μm in the coating film of the present invention. This supports the above hypothesis. The mean particle size of non-leafing aluminum flakes to be used is preferably selected appropriately in consideration of required dry film thickness, appearance, and other factors from currently available non-leafing aluminum flakes. While any commercially available non-leafing aluminum flakes having a mean particle size D50 of 6 μm to 54 μm is used, the non-leafing aluminum flakes preferably selected for formation of a coating film required to be thinned have a mean particle size D50 of 6 to 22 μm and more preferably 6 to 15 μm.

The blending ratio of the non-leafing aluminum flakes that are preferably selected for forming the coating film is preferably 1.0 to 4.5 parts by mass, more preferably 1.0 to 4.0 parts by mass, and particularly preferably 1.0 to 3.0 parts by mass, relative to 100 parts by mass of the coating paint. The blending ratio of the non-leafing aluminum flakes in the coating film after drying is preferably 2.0 to 10.0% by mass, more preferably 2.0 to 9.0% by mass, and particularly preferably 2.0 to 7.0% by mass, relative to 100% by mass of the coating film (corresponding to paint solid content). If the blending ratio of the non-leafing aluminum flakes in the coating paint or the coating film is excessively small, the effect of the non-leafing aluminum flakes is difficult to effectively exert. Meanwhile, if the blending ratio of the non-leafing aluminum flakes in the coating paint or the coating film is excessively large, the insulating properties and the adhesiveness of the coating film deteriorate.

As the resin material according to the present invention, the resin material having excellent adhesiveness to metal and excellent water resistance, and having low viscosity in a dissolved state is preferred. Examples of such a resin material include epoxy resins, phenol resins, and acryl resins. Examples of the epoxy resins include various epoxy resins including bisphenol A type, bisphenol F type, phenoxy type, novolac type, aliphatic type, and glycidylamine type epoxy resins. Preferable examples of the epoxy resins include bisphenol type epoxy resins such as bisphenol A type and bisphenol F type epoxy resins. Bisphenol A type epoxy resins are particularly preferred. Particularly preferred examples of the phenol resins include resol type phenol resins. Among the above-described examples, as a combination in which a hardening effect by the cross reaction is exerted, and thixotropy, insulating properties, film elasticity, and appearance are excellent, a mixture of an epoxy resin such as a bisphenol A type epoxy resin, and a resol type phenol resin in a mass ratio of 16:1 to 2:1, more preferably 12:1 to 2:1, particularly preferably 9:1 to 2:1, and still more preferably 4:1 to 2:1 is used.

The resin material is contained in an amount of preferably 10 to 20 parts by mass, more preferably 13 to 18 parts by mass, and particularly preferably 14 to 16 parts by mass, relative to 100 parts by mass of the coating paint containing a solvent. The blending ratio of the resin material is preferably 24 to 40% by mass, more preferably 30 to 38% by mass, and particularly preferably 31 to 35% by mass, relative to 100% by mass of the coating film (corresponding to the paint solid content). If the blending ratio of the resin material to the coating paint or the coating film (corresponding to the paint solid content) is excessively small, the coating film is rigidified. Meanwhile, if the blending ratio of the resin material to the coating paint or the coating film (corresponding to the paint solid content) is excessively large, an appropriate blending amount of other components is difficult to ensure.

Also, when an epoxy resin is used as the resin material in the present invention, preferably, the coating paint further contains an imidazole-based hardening accelerator. By using an imidazole-based hardening accelerator as the hardening accelerator for the epoxy resin, the color of the coating film of the present invention is made close to the color of the zinc composite film, and the defective appearance due to partial deficiency of the coating film is more effectively inhibited. The reason is considered to be that the imidazole-based hardening accelerator does not have a coloring functional group such as amine contained in organic acid hydrazine.

Examples of the imidazole-based hardening accelerator include imidazole, 2-undecylimidazole, 2-heptadecylimidazole, 2-methylimidazole, 2-ethylimidazole, 2-phenylimidazole, 2-ethyl-4-methyl-imidazole, 1-cyanoethyl-2-undecylimidazole, 1-cyanoethyl-2-methylimidazole, 1-cyanoethyl-2-undecylimidazolium trimellitate, 1-cyanoethyl-2-ethyl-4-methylimidazole, and the like. One kind of the imidazole-based hardening accelerators is used solely, or two or more kinds of the imidazole-based hardening accelerators are used.

As the hardening accelerator for the epoxy resin, another hardening accelerator such as dicyandiamide is used together with the imidazole-based hardening accelerator.

The blending ratio of the hardening accelerator for the epoxy resin is preferably 0.1 to 0.5 parts by mass, and more preferably 0.2 to 0.4 parts by mass, relative to 100 parts by mass of the coating paint. The blending ratio of the hardening accelerator for the epoxy resin is preferably 0.2 to 1.1% by mass, and more preferably 0.4 to 0.9% by mass, relative to 100% by mass of the coating film (corresponding to the paint solid content).

As the extender pigment according to the present invention, soft pigments among standard extender pigments are preferably used. Preferable examples of the soft extender pigments include talc, magnesium silicate, aluminum sulfate, barium sulfate, and the like.

The blending ratio of the extender pigment is preferably 10 to 30 parts by mass, more preferably 19 to 27 parts by mass, and particularly preferably 21 to 25 parts by mass, relative to 100 parts by mass of the coating paint of the present invention. The blending ratio of the extender pigment is preferably 30 to 57% by mass, more preferably 45 to 54% by mass, and particularly preferably 48 to 52% by mass, relative to 100% by mass of the coating film (corresponding to paint solid content). If the blending ratio of the extender pigment to the coating paint or the coating film (corresponding to paint solid content) is excessively small, the coating film is rigidified, or the corrosion resistance is negatively affected. Meanwhile, if the blending ratio of the extender pigment to the coating paint or the coating film (corresponding to paint solid content) is excessively large, the extender pigment is difficult to disperse uniformly in the coating paint, or the adhesiveness of the coating film deteriorates.

Although a coloring pigment such as carbon black, titanium oxide (titanium white), or triiron tetroxide having high coloring ability and covering properties corresponds to neither the extender pigment nor the antirust pigment in the present invention, such a coloring pigment is blended appropriately depending on the request for coloring, and in such a case, the extender pigment at the blending ratio is partly replaced by the coloring pigment.

The coating paint of the present invention optionally contains an antirust pigment other than the non-leafing aluminum flakes. As the antirust pigment for the coating paint, at least one of a phosphate and a silicate is preferably used. Thus, zinc in the zinc composite film is inhibited from being eluted and the antirust effect of the zinc composite film is maintained for a long time. Preferable examples of the antirust pigment include zinc phosphate, magnesium phosphate, aluminum phosphate, calcium phosphate, zinc tripolyphosphate, magnesium tripolyphosphate, aluminum tripolyphosphate, and calcium tripolyphosphate.

When the antirust pigment other than the non-leafing aluminum flakes is blended, the blending ratio of the antirust pigment is preferably 2.5 to 8.5 parts by mass, more preferably 3 to 8 parts by mass, and particularly preferably 4 to 7 parts by mass, relative to 100 parts by mass of the coating paint. When the antirust pigment other than the non-leafing aluminum flakes is blended, the blending ratio of the antirust pigment is 5 to 18% by mass, more preferably 6 to 17% by mass, and particularly preferably 8 to 15% by mass, relative to 100% by mass of the coating film (corresponding to paint solid content). If the blending ratio of the antirust pigment other than the non-leafing aluminum flakes to the coating paint or the coating film (corresponding to paint solid content) is excessively small, the corrosive resistance of the coating film is negatively affected. Meanwhile, if the blending ratio of the antirust pigment other than the non-leafing aluminum flakes to the coating paint or the coating film (corresponding to paint solid content) is excessively large, the adhesiveness of the coating film sometimes deteriorates.

One example of a preferable blending ratio of each component in the coating film according to the present invention is: 30 to 38% by mass of the resin material, 2 to 9% by mass of the non-leafing aluminum flakes, 6 to 17% by mass of the antirust pigment other than the non-leafing aluminum flakes, 45 to 54% by mass of the extender pigment, and 0.2 to 1.1% by mass of the imidazole-based hardening accelerator, relative to 100% by mass of the coating film (corresponding to paint solid content). Also, one example of a more preferable blending ratio of each component in the coating film according to the present invention is: 31 to 35% by mass of the resin material, 2 to 7% by mass of the non-leafing aluminum flakes, 8 to 15% by mass of the antirust pigment other than the non-leafing aluminum flakes, 48 to 52% by mass of the extender pigment, and 0.4 to 0.9% by mass of the imidazole-based hardening accelerator, relative to 100% by mass of the coating film (corresponding to paint solid content).

The coating paint of the present invention contains an organic solvent. As the organic solvent, organic solvents such as aromatic solvents, alcohol-based solvents, and ketone-based solvents having a high boiling point and solubility of the resin material are preferably used. Preferable examples of the aromatic solvents include toluene, xylene, ethylbenzene, phenol, and the like. Preferable examples of the ketone-based solvents include methylethylketone, methylbutylketone, and the like. Preferable examples of the alcohol-based solvents include ethyleneglycol monobutylether, butanol, ethanol, methanol, and the like. These solvents are each used solely or used as a mixture containing two or more kinds of the solvents. In other words, the organic solvent is preferably at least one selected from at least one aromatic solvent selected from toluene, xylene, ethylbenzene, and phenol, at least one alcohol-based solvent selected from ethyleneglycol monobutylether, butanol, ethanol, and methanol, and at least one ketone-based solvent selected from methylethylketone and methylbutylketone.

The blending ratio of the organic solvent in the coating paint is adjusted as appropriate so that the coating paint is appropriately applied on the zinc composite film. That is, the coating paint of the present invention contains an organic solvent in an amount suited for application. The blending ratio of the organic solvent is, for example, 48 to 61 parts by mass, or 50 to 59 parts by mass, relative to 100 parts by mass of the coating paint.

One example of a preferable blending ratio of each component in the coating paint according to the present invention is: 13 to 18 parts by mass of the resin material, 1.0 to 4.0 parts by mass of the non-leafing aluminum flakes, 3 to 8 parts by mass of the antirust pigment other than the non-leafing aluminum flakes, 19 to 27 parts by mass of the extender pigment, 0.1 to 0.5 parts by mass of the imidazole-based hardening accelerator, and 48 to 61 parts by mass of the organic solvent, relative to 100 parts by mass of the coating paint. Also, one example of a more preferable blending ratio of each component in the coating paint according to the present invention is: 14 to 16 parts by mass of the resin material, 1.0 to 3.0 parts by mass of the non-leafing aluminum flakes, 4 to 7 parts by mass of the antirust pigment other than the non-leafing aluminum flakes, 21 to 25 parts by mass of the extender pigment, 0.2 to 0.4 parts by mass of the imidazole-based hardening accelerator, and 50 to 59 parts by mass of the organic solvent, relative to 100 parts by mass of the coating paint.

The pencil hardness of the coating film in the rustproof metal member of the present invention is preferably F to B. More preferably, the pencil hardness is F. When the pencil hardness of the coating film falls within this range, the coating film is softened, and the strength of the coating film is sufficiently ensured. The pencil hardness in the description herein indicates a scratch hardness defined in JIS K 5600-5-4 (formerly defined in JIS K 5400-8-4-2).

A color difference ΔB between the coating film of the present invention and the zinc composite film on the lower layer is preferably less than or equal to 10 degrees, more preferably less than or equal to 5 degrees, and particularly preferably less than or equal to 3 degrees.

A hose ASSY corrosion resistance of the coating film of the present invention preferably indicates a measurement value greater than or equal to 1500 hours both at an ordinary temperature and at a heat resistance temperature. The coating film of the present invention preferably has a volume resistance of more than or equal to $1\times10^{13}$ Ω·cm. The coating film of the present invention preferably has an Erichsen peeling diameter of less than or equal to 3 mm. The coating film of the present invention preferably has a TI value of greater than or equal to 3.5.

As described above, since the rustproof metal member of the present invention contains the non-leafing aluminum flakes in the coating film, the sacrificial anticorrosive effect of the zinc composite film is further improved, and the defective appearance due to partial deficiency of the coating film is inhibited.

Also, since the coating paint of the present invention is a lacquer-based one, uniform coating with a thin film is achieved, and the paintability of the coating paint, and the insulating properties, the adhesiveness, the hardenability, and the like of the coating film are improved effectively by devising blending of resins.

Further, when the imidazole-based hardening accelerator is added to the coating paint of the present invention, coloring of the coating film becomes difficult and the color of the coating film is made close to the silver of the underlying zinc composite film. Therefore, appearance is more effectively inhibited from becoming defective due to scratching of the coating film.

The present invention exerts excellent anticorrosive effect for parts such as an iron clip and an iron hose clamp used at a high temperature and highly corrosive environments (in the presence of snow melting salt or sea salt particles, electrolytic corrosion with a noble substance).

Although the embodiments of the present invention have been described above, the present invention is not limited to the above-described embodiments. The present invention is implemented various modes with modifications, improvements, and the like that are made by a person skilled in the art without departing from the gist of the present invention.

EXAMPLES

The rustproof metal member and the coating paint of the present invention are specifically described below. The present invention is not limited by the following examples. For the details of the physical property testing for the coating paint, each item in JIS K 5492 (2014) Aluminium Paint, and JIS K 5600 "Testing methods for paints" is referred to.

FIG. 1 is a perspective view schematically showing a hose clamp that is used as the rustproof metal member having a predetermined shape in Example of the present invention.

Figure 2:
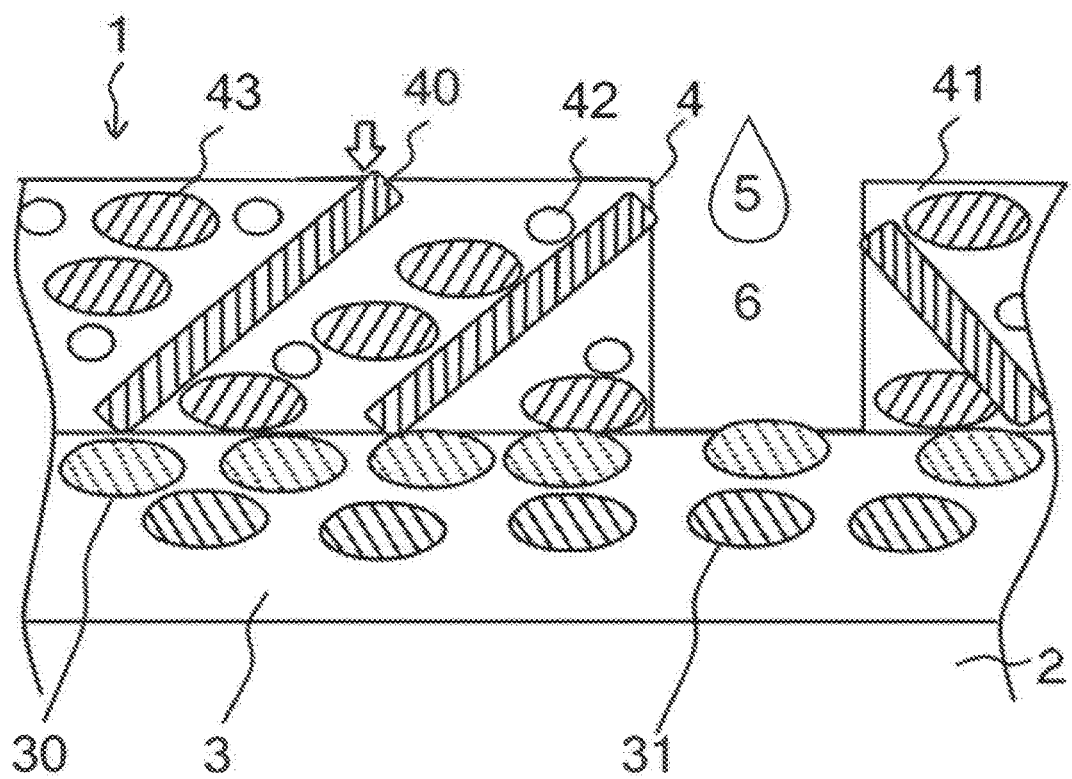
FIG. 2 schematically illustrates the action of the coating film in the rustproofed metal member of the present invention.

FIG. 2 is an enlarged cross-sectional view schematically showing the surface structure of the rustproof metal member produced in Example. A rustproof metal member 1 in FIG. 2 includes a metal member 2, a zinc composite film 3 formed on a surface of the metal member 2, and a coating film 4 formed on the zinc composite film 3. The metal member 2 is made of steel, and, as a whole, is hose-clamp-shaped as shown in FIG. 1.

The metal member having the zinc composite film used in Example was produced in the following manner.

First, a metal member that was a preliminarily prepared steel hose clamp (plate thickness 0.7 mm, plate width 8 mm, diameter (free diameter) 8.6 mm) was subjected to shot peening treatment to roughen the oxide film on the surface of the metal member. The treated metal member was dipped in a GEOMET 720 (Registered trademark of NOF METAL COATINGS. A commercially available product produced by binding zinc and aluminum flakes by a special inorganic binder, and having a silver appearance.) treatment liquid at 20 to 25° C. for 2 to 6 minutes. After the dipping, the GEOMET 720 treatment liquid was adhered uniformly onto the metal member by using a dip-spin device, and the metal member was heated at 320 to 360° C. for 30 to 45 minutes in an electric heating hot air circulating oven. After the heating, the metal member was cooled at room temperature. By repeatedly performing the foregoing treatment twice, a metal member (hereinafter, referred to as "zinc-coated metal member") having a zinc composite film formed in a coating amount of 220 mg/dm$^2$ on the surface was obtained.

Production Example 1

A coating paint as a material of a coating film was produced in the following manner.

First, 12.4 parts by mass of a bisphenol type epoxy resin and 3.1 parts by mass of a resol type phenol resin (Blended as a resin material. A mass ratio of epoxy resin:phenol resin was 4:1), 0.3 parts by mass of imidazole (Blended as a hardening accelerator for epoxy resin), 23.2 parts by mass of magnesium silicate (mean particle size 7 μm, blended as an extender pigment), 5.6 parts by mass of aluminum tripolyphosphate (mean particle size 1 μm, blended as an antirust pigment), 1.7 parts by mass of non-leafing aluminum flakes (mean particle size 15 μm, blended as an antirust pigment), and 53.7 parts by mass of methylethylketone (blended as an organic solvent) were prepared.

A mixture (hereinafter, referred to as a coating powder material) of the resin material, the antirust pigment, the extender pigment, and the coloring pigment was stirred in a ball mill for 180 minutes. The stirred coating powder material was mixed with an organic solvent to prepare a coating paint. At this time, the resin material was completely dissolved in the organic solvent. The pigments including the non-leafing aluminum flakes were dispersed in the organic solvent. The coating paint of Production Example 1 obtained by the mixing had silver color.

In the coating paint (ordinary temperature) produced in Production Example 1, the above-described zinc-coated metal member was dipped for 2 to 6 minutes. After the dipping, the coating paint was adhered uniformly onto the zinc-coated metal member by using a dip-spin device, and the metal member was heated at 180° C. for 20 minutes in an electric heating hot air circulating oven. After the heating, the metal member was cooled at room temperature. By repeatedly performing the foregoing treatment twice, a coating film produced from the coating paint of Production Example 1 was formed on the zinc-coated metal member. At this time, the coating amount of the coating film according to JIS K 5600-1-7 (mass method) was 150 mg/dm$^2$. The application thickness obtained by converting the density into an average film thickness was 10 μm (two-time applications in each of which the thickness was 5 μm).

By the above-described process, a rustproof metal member of Example 1 in which a zinc composite film was formed on the surface of the metal member, and a coating film was formed on the zinc composite film was obtained.

Coating paints and rustproof metal members on which the coating paints were respectively applied, according to Examples 2 to 20 and Comparative Examples 1 to 2, were obtained in the same procedure by changing the kinds and the blending ratio of materials, and the baking condition and the like. Changes in the kinds, particle sizes, and blending ratio of materials, the baking temperature and other conditions are specifically indicated in cells for the coating component in Table 1 to Table 5. Every unit in the cells for the coating component is % by mass except for the cell of "Ratio of epoxy resin:phenol resin".

Various physical properties of the rustproof metal members produced in Examples or Comparative Examples were measured, and indicated in the cells for the physical properties in Table 1 to Table 5. Measurement conditions of these tests were as follows.

(Evaluation Tests)

(1. Paintability Test)

After preparation, for the coating paints before application, type B viscosity according to JIS K 5600 by a rotational viscometer, cup viscosity by Iwata cup No. 2, and shear rate dependency (TI value) as thixotropic properties were measured. The viscosities, and the TI value were adjusted in accordance with the target film thickness. When the TI value was somewhat high, the paintability improved, and occurrence of a defect such as nonuniformity in application due to dropping, flowing, or the like at the time of application was reduced even with low viscosity. Also, the coating paint had a low viscosity and the coating film was formed to have a small thickness.

(2. Insulating Property Test)

As a resistance of the formed coating film, a volume resistance and a surface resistance were measured. The coating film having a high resistance had high insulating properties in the part of the resin component of the coating film, and had a high antirust effect against general electrolytic corrosion.

(3. Adhesiveness Test)

For each rustproof metal member, the Erichsen peeling diameter was measured. The Erichsen peeling diameter indicates the degree of peeling of a coating paint that causes collision having the same momentum and chips. The smaller the peeling diameter, the better the performance.

For each rustproof metal member, the pencil scratch hardness of the coating film was measured. The pencil hardness was measured according to JIS K 5600-5-4.

(4. Corrosion Resistance Evaluation Test)

For each rustproof metal member, an antirust performance evaluation test (salt spray test in compliance with JIS Z 2371) was conducted. The antirust performance evaluation test was conducted under three kinds of test conditions by using five rustproof metal members of each of Examples and Comparative Examples. The results (the unit was hour) of the antirust performance evaluation test are indicated in the cells for SST hose ASSY (corrosion resistance) in Table 1 to Table 5. The result for the member having no scratch after application and drying of the coating paint, is indicated in the cells for "ordinary temperature (without scratch)". The result of the corrosion resistance test of the member having a scratch visibly observed on the coating film due to chipping or the like when the member was dropped five times from the height of 1 m after application and drying of the coating paint, is indicated in the cells for "ordinary temperature (with scratch)". The member having no scratch was treated at 250° C. for 12 hours, and subjected to a corrosion resistance test, and the result of the test is indicated in the cells for "heat resistance temperature (without scratch, after 12H at 250° C.)".

Among the results, the member in which no red rust occurred after the elapse of 1500 hours or more from the start of the antirust performance evaluation test was indicated as >1500 and evaluated as excellent.

(5. Hardenability Test)

For the coating paint of each rustproof metal member, a hardenability test according to solvent resistance was conducted. Methylethylketone as an organic solvent was immersed in absorbent cotton and rubbed a predetermined number of times onto the surface of the rustproof metal member on which the coating paint was applied and sufficiently hardened and dried, and whether or not the coating of the coating paint was lost due to dissolution was checked. The member having no sufficient solvent resistance was evaluated as being poor in hardenability since the hardening reaction of the epoxy resin and the phenol resin which were resin components in the coating paint was not considered to sufficiently progress.

(6. Heat Resistance)

For each rustproof metal member, a temperature at which the thermal weight decreased by 5% was measured. The decrease in the thermal weight is indicative of the thermal decomposition temperature of the resin component, and is thus indicative of heat resistance.

(7. Appearance Test)

For each rustproof metal member, color difference ΔB between color tone b* (SCE, specular component excluded) of the coating film at an ordinary temperature, and color tone b* (SCE, specular component excluded) of the zinc composite film at an ordinary temperature was measured. Also, color difference ΔB between color tone b* (SCE) of the coating film baked at 200° C., and color tone b* (SCE) of the coating film baked at 180° C. was measured. The color difference ΔB was a value measured by using a spectral colorimeter (model CM-3600d, available from KONICA MINOLTA, INC.) as a color difference meter on the basis of JIS Z 8730.

(8. Storage Stability Test)

Each coating paint was left still at room temperature of 40° C. for 1 month, and occurrence of thickening, separation, and floating was checked.

TABLE 1

| | | | | Example 1 Antirust pigment | Example 2 Epoxy resin | Example 3 Epoxy resin | Example 4 Antirust pigment | Example 5 Antirust pigment | Example 6 Antirust pigment |
|---|---|---|---|---|---|---|---|---|---|
| Coating component wt % | Resin | Bisphenol type epoxy resin | | 12.4 | 13.95 | 13.95 | 12.4 | 12.4 | 12.4 |
| | | Resol type phenol resin | | 3.1 | 1.55 | 1.55 | 3.1 | 3.1 | 3.1 |
| | | Ratio of epoxy resin:phenol resin | | 4.0 | 9.0 | 9.0 | 4.0 | 4.0 | 4.0 |
| | Hardening accelerator | Imidazole | | 0.3 | 0.3 | 0.3 | 0.3 | 0.3 | 0.3 |
| | | Dicyandiamide | | 0.0 | 0.0 | 0.0 | 0.0 | 0.0 | 0.0 |
| | | Organic acid hydrazide | | 0.0 | 0.0 | 0.0 | 0.0 | 0.0 | 0.0 |
| | Extender pigment | Magnesium silicate | Mean particle size 7 μm | 23.2 | 23.2 | 23.2 | 23.2 | 23.2 | 23.2 |
| | | Talc | Mean particle size 7 μm | 0.0 | 0.0 | 0.0 | 0.0 | 0.0 | 0.0 |
| | Antirust pigment | Aluminum tripolyphosphate | Mean particle size 1 μm | 5.6 | 5.6 | 0.0 | 5.6 | 5.6 | 5.6 |
| | | Magnesium phosphate | Mean particle size 1 μm | 0.0 | 0.0 | 5.6 | 0.0 | 0.0 | 0.0 |
| | | Non-leafing aluminum flake | Mean particle size 15 μm | 1.7 | 1.7 | 1.7 | 0.0 | 0.0 | 1.0 |
| | | | Mean particle size 10 μm | 0.0 | 0.0 | 0.0 | 1.7 | 0.0 | 0.0 |
| | | | Mean particle size 6 μm | 0.0 | 0.0 | 0.0 | 0.0 | 1.7 | 0.0 |
| | Coloring pigment | Leafing aluminum flake | Mean particle size 15 μm | 0.0 | 0.0 | 0.0 | 0.0 | 0.0 | 0.0 |
| | | Titanium oxide | Mean particle size 0.3 μm | 0.0 | 0.0 | 0.0 | 0.0 | 0.0 | 0.0 |
| | Solvent | Methylethylketone | | 53.7 | 53.7 | 53.7 | 53.7 | 53.7 | 54.4 |
| | | Butanol | | 0.0 | 0.0 | 0.0 | 0.0 | 0.0 | 0.0 |
| | | Baking temperature | | 180° C., 20 min | | | | | |
| Viscosity | Type B viscosity (JIS K 5600 by rotational viscometer) | | 6 rpm | 138 | 138 | 138 | 141 | 142 | 132 |
| | | | 60 rpm | 33 | 33 | 33 | 35 | 30 | 29 |
| | TI value (paintability) | | | 4.1 | 4.1 | 4.1 | 4 | 4.7 | 4.5 |
| | Cup viscosity (Iwata cup No. 2) | | | 13.0 | 13.0 | 13.0 | 13.0 | 14.0 | 13.0 |
| Physical properties | Resistance (Insulating properties) | | Volume | $2.2 \times 10^{13}$ | $2.2 \times 10^{13}$ | $2.2 \times 10^{13}$ | $2.4 \times 10^{13}$ | $2.5 \times 10^{13}$ | $2.5 \times 10^{13}$ |
| | | | Surface | $2.5 \times 10^{13}$ | $2.5 \times 10^{13}$ | $2.5 \times 10^{13}$ | $2.8 \times 10^{13}$ | $2.6 \times 10^{13}$ | $2.7 \times 10^{13}$ |
| | Erichsen peeling diameter | | (Adhesiveness) | 2.5 | 2.1 | 2.1 | 2.5 | 2.5 | 2.3 |
| | Pencil hardness | | | F | F | F | F | F | F |
| | SST hose ASSY (corrosion resistance) | Ordinary temperature (without scratch) | | >1500 | >1500 | >1500 | >1500 | >1500 | >1500 |
| | | Ordinary temperature (with scratch) | | >1500 | >1500 | >1500 | >1500 | >1500 | >1500 |
| | | Heat resistance temperature (without scratch, after 12 H at 250° C.) | | >1500 | >1500 | >1500 | >1500 | >1500 | >1500 |
| | MEK rubbing (hardenability) | | | excellent | excellent | excellent | excellent | excellent | excellent |
| | Thermal weight decrease temperature TG (heat resistance) | | | 300° C. | 300° C. | 300° C. | 300° C. | 300° C. | 300° C. |

TABLE 1-continued

|  |  | Example 1 Antirust pigment | Example 2 Epoxy resin | Example 3 Epoxy resin | Example 4 Antirust pigment | Example 5 Antirust pigment | Example 6 Antirust pigment |
|---|---|---|---|---|---|---|---|
|  | Color difference ΔB (appearance) | 2.3 | 2 | 2 | 2.3 | 2.3 | 2.3 |
|  | Color difference ΔB (appearance) between 200° C. and 180° C. | 1.1 | 0.8 | 0.8 | 1.1 | 1.1 | 1.1 |
|  | Storage stability 40° C., 1 month | excellent | excellent | excellent | excellent | excellent | excellent |
| Performance deterioration item | Paintability | — | — | — | — | — | — |
|  | Insulating properties | — | — | — | — | — | — |
|  | Adhesiveness | — | — | — | — | — | — |
| Corrosion resistance | Ordinary temperature (without scratch) | — | — | — | — | — | — |
|  | Ordinary temperature (with scratch) | — | — | — | — | — | — |
|  | Heat resistance temperature (without scratch, after 12 H at 250° C.) | — | — | — | — | — | — |
|  | Hardenability | — | — | — | — | — | — |
|  | Heat resistance | — | — | — | — | — | — |
|  | Appearance | — | — | — | — | — | — |
|  | Storage stability 40° C., 1 month | — | — | — | — | — | — |

TABLE 2

|  |  |  |  | Example 7 Antirust pigment | Example 8 Extender pigment | Example 9 Antirust pigment | Example 10 Hardening accelerator | Example 11 Solvent |
|---|---|---|---|---|---|---|---|---|
| Coating component wt % | Resin | Bisphenol type epoxy resin |  | 12.4 | 12.4 | 12.4 | 12.4 | 12.4 |
|  |  | Resol type phenol resin |  | 3.1 | 3.1 | 3.1 | 3.1 | 3.1 |
|  |  | Ratio of epoxy resin:phenol resin |  | 4.0 | 4.0 | 4.0 | 4.0 | 4.0 |
|  | Hardening accelerator | Imidazole |  | 0.3 | 0.3 | 0.3 | 0.2 | 0.3 |
|  |  | Dicyandiamide |  | 0.0 | 0.0 | 0.0 | 0.1 | 0.0 |
|  |  | Organic acid hydrazide |  | 0.0 | 0.0 | 0.0 | 0.0 | 0.0 |
|  | Extender pigment | Magnesium silicate | Mean particle size 7 μm | 23.2 | 0.0 | 23.2 | 23.2 | 23.2 |
|  |  | Talc | Mean particle size 7 μm | 0.0 | 23.2 | 0.0 | 0.0 | 0.0 |
| Antirust | Antirust pigment | Aluminum tripolyphosphate | Mean particle size 1 μm | 5.6 | 5.6 | 0.0 | 5.6 | 5.6 |
|  |  | Magnesium phosphate | Mean particle size 1 μm | 0.0 | 0.0 | 5.6 | 0.0 | 0.0 |
|  |  | Non-leafing aluminum flake | Mean particle size 15 μm | 3.0 | 1.7 | 1.7 | 1.7 | 1.7 |
|  |  |  | Mean particle size 10 μm | 0.0 | 0.0 | 0.0 | 0.0 | 0.0 |
|  |  |  | Mean particle size 6 μm | 0.0 | 0.0 | 0.0 | 0.0 | 0.0 |
|  | Coloring pigment | Leafing aluminum flake | Mean particle size 15 μm | 0.0 | 0.0 | 0.0 | 0.0 | 0.0 |
|  |  | Titanium oxide | Mean particle size 0.3 μm | 0.0 | 0.0 | 0.0 | 0.0 | 0.0 |
|  | Solvent | Methylethylketone |  | 52.4 | 53.7 | 53.7 | 53.7 | 0.0 |
|  |  | Butanol |  | 0.0 | 0.0 | 0.0 | 0.0 | 53.7 |
| Baking temperature |  |  |  | 180° C., 20 min | | | | |
| Viscosity | Type B viscosity (JIS K 5600 by rotational viscometer) | 6 rpm |  | 133 | 132 | 133 | 138 | 138 |
|  |  | 60 rpm |  | 32 | 29 | 32 | 32 | 33 |
|  | TI value (paintability) |  |  | 4.2 | 4.5 | 4.2 | 4.1 | 4.1 |
|  | Cup viscosity (Iwata cup No. 2) |  |  | 13.0 | 13.0 | 13.0 | 13.0 | 13.0 |
| Physical properties | Resistance (Insulating properties) | Volume |  | $2.0 \times 10^{13}$ | $2.3 \times 10^{13}$ | $2.2 \times 10^{13}$ | $2.2 \times 10^{13}$ | $2.2 \times 10^{13}$ |
|  |  | Surface |  | $2.0 \times 10^{13}$ | $2.4 \times 10^{13}$ | $2.3 \times 10^{13}$ | $2.5 \times 10^{13}$ | $2.5 \times 10^{13}$ |
|  | Erichsen peeling diameter (Adhesiveness) |  |  | 2.6 | 2.5 | 2.5 | 2.5 | 2.5 |
|  | Pencil hardness |  |  | F | F | F | F | F |
| SST hose ASSY (corrosion resistance) | Ordinary temperature (without scratch) |  |  | >1500 | >1500 | >1500 | >1500 | >1500 |
|  | Ordinary temperature (with scratch) |  |  | >1500 | >1500 | >1500 | >1500 | >1500 |
|  | Heat resistance temperature (without scratch, after 12 H at 250° C.) |  |  | >1500 | >1500 | >1500 | >1500 | >1500 |

TABLE 2-continued

|  |  |  | Example 7 Antirust pigment | Example 8 Extender pigment | Example 9 Antirust pigment | Example 10 Hardening accelerator | Example 11 Solvent |
|---|---|---|---|---|---|---|---|
|  |  | MEK rubbing (hardenability) | excellent | excellent | excellent | excellent | excellent |
|  |  | Thermal weight decrease temperature TG (heat resistance) | 300° C. | 300° C. | 300° C. | 300° C. | 300° C. |
|  |  | Color difference ΔB (appearance) | 2.3 | 2.3 | 2.3 | 2.3 | 2.3 |
|  |  | Color difference ΔB (appearance) between 200° C. and 180° C. | 1.1 | 1.1 | 1.1 | 1.1 | 1.1 |
|  |  | Storage stability 40° C., 1 month | excellent | excellent | excellent | excellent | excellent |
| Performance deterioration item |  | Paintability | — | — | — | — | — |
|  |  | Insulating properties | — | — | — | — | — |
|  |  | Adhesiveness | — | — | — | — | — |
|  | Corrosion resistance | Ordinary temperature (without scratch) | — | — | — | — | — |
|  |  | Ordinary temperature (with scratch) | — | — | — | — | — |
|  |  | Heat resistance temperature (without scratch, after 12 H at 250° C.) | — | — | — | — | — |
|  |  | Hardenability | — | — | — | — | — |
|  |  | Heat resistance | — | — | — | — | — |
|  |  | Appearance | — | — | — | — | — |
|  |  | Storage stability 40° C., 1 month | — | — | — | — | — |

TABLE 3

|  |  |  |  | Comp. Ex. 1 Antirust pigment | Comp. Ex. 2 | Example 12 Antirust pigment | Example 13 | Example 14 Baking temperature |
|---|---|---|---|---|---|---|---|---|
| Coating component wt % | Resin | Bisphenol type epoxy resin |  | 12.4 | 12.4 | 12.4 | 12.4 | 12.4 |
|  |  | Resol type phenol resin |  | 3.1 | 3.1 | 3.1 | 3.1 | 3.1 |
|  |  | Ratio of epoxy resin:phenol resin |  | 4.0 | 4.0 | 4.0 | 4.0 | 4.0 |
|  | Hardening accelerator | Imidazole |  | 0.3 | 0.3 | 0.3 | 0.3 | 0.3 |
|  |  | Dicyandiamide |  | 0.0 | 0.0 | 0.0 | 0.0 | 0.0 |
|  |  | Organic acid hydrazide |  | 0.0 | 0.0 | 0.0 | 0.0 | 0.0 |
|  | Extender pigment | Magnesium silicate | Mean particle size 7 μm | 23.2 | 23.2 | 23.2 | 23.2 | 23.2 |
|  |  | Talc | Mean particle size 7 μm | 0.0 | 0.0 | 0.0 | 0.0 | 0.0 |
|  | Antirust pigment | Aluminum tripolyphosphate | Mean particle size 1 μm | 5.6 | 5.6 | 5.6 | 5.6 | 5.6 |
|  |  | Magnesium phosphate | Mean particle size 1 μm | 0.0 | 0.0 | 0.0 | 0.0 | 0.0 |
|  |  | Non-leafing aluminum flake | Mean particle size 15 μm | 0.0 | 0.0 | 0.0 | 0.0 | 1.7 |
|  |  |  | Mean particle size 10 μm | 0.0 | 0.0 | 0.5 | 5.0 | 0.0 |
|  |  |  | Mean particle size 6 μm | 0.0 | 0.0 | 0.0 | 0.0 | 0.0 |
|  | Coloring pigment | Leafing aluminum flake | Mean particle size 15 μm | 2.0 | 0.0 | 0.0 | 0.0 | 0.0 |
|  |  | Titanium oxide | Mean particle size 0.3 μm | 0.0 | 2.0 | 0.0 | 0.0 | 0.0 |
|  | Solvent | Methylethylketone |  | 53.4 | 53.4 | 54.9 | 50.4 | 53.7 |
|  |  | Butanol |  | 0.0 | 0.0 | 0.0 | 0.0 | 0.0 |
|  | Baking temperature |  |  |  | 180° C., 20 min |  |  | 220° C., 20 min |
| Viscosity | Type B viscosity (JIS K 5600 by rotational viscometer) | 6 rpm |  | 158 | 152 | 122 | 154 | 138 |
|  |  | 60 rpm |  | 27 | 33 | 32 | 35 | 33 |
|  | TI value (paintability) |  |  | 5.8 | 4.2 | 3.8 | 4.4 | 4.1 |
|  | Cup viscosity (Iwata cup No. 2) |  |  | 14.0 | 14.0 | 13.0 | 14.0 | 13.0 |
| Physical properties | Resistance (Insulating properties) | Volume |  | Unevaluated due to aggregation and separation of aluminum flakes | $2.7 \times 10^{13}$ | $2.2 \times 10^{13}$ | $1.8 \times 10^{11}$ | $2.2 \times 10^{13}$ |
|  |  | Surface |  |  | $2.8 \times 10^{13}$ | $2.4 \times 10^{13}$ | $1.7 \times 10^{11}$ | $2.5 \times 10^{13}$ |
|  | Erichsen peeling diameter (Adhesiveness) |  |  |  | 4 | 2.5 | 3.4 | 2.5 |
|  | Pencil hardness |  |  |  | F | F | F | F |
|  | SST hose ASSY (corrosion resistance) | Ordinary temperature (without scratch) |  |  | >1500 | >1500 | 1000 | >1500 |
|  |  | Ordinary temperature (with scratch) |  |  | 500 | 500 | 1000 | >1500 |
|  |  | Heat resistance temperature (without scratch, after 12 H at 250° C.) |  |  | >1500 | >1500 | 750 | >1500 |

TABLE 3-continued

|  |  | Comp. Ex. 1 Antirust pigment | Comp. Ex. 2 Antirust pigment | Example 12 Antirust pigment | Example 13 | Example 14 Baking temperature |
|---|---|---|---|---|---|---|
|  | MEK rubbing (hardenability) | excellent | excellent | excellent | excellent | excellent |
|  | Thermal weight decrease temperature TG (heat resistance) | 300° C. | 300° C. | 300° C. | 300° C. | 300° C. |
|  | Color difference ΔB (appearance) | 10.2 | 8.1 | 2.3 | 7.8 | |
|  | Color difference ΔB (appearance) between 200° C. and 180° C. | 6.2 | 4.8 | 1.1 | 4.2 | |
|  | Storage stability 40° C., 1 month | excellent | excellent | excellent | excellent | |
| Performance deterioration item | Paintability | — | — | — | — | — |
|  | Insulating properties | — | — | — | poor | — |
|  | Adhesiveness | — | poor | — | poor | — |
| Corrosion resistance | Ordinary temperature (without scratch) | — | — | — | good | — |
|  | Ordinary temperature (with scratch) | — | poor | poor | good | — |
|  | Heat resistance temperature (without scratch, after 12 H at 250° C.) | — | — | — | good | — |
|  | Hardenability | — | — | — | — | — |
|  | Heat resistance | — | — | — | — | — |
|  | Appearance | — | poor | good | — | good |
|  | Storage stability 40° C., 1 month | — | — | — | — | — |

TABLE 4

|  |  |  |  | Example 15 | Example 16 Resin ratio | Example 17 | Example 18 Extender pigment |
|---|---|---|---|---|---|---|---|
| Coating component wt % | Resin | Bisphenol type epoxy resin | | 10.0 | 15.0 | 12.4 | 12.4 |
|  |  | Resol type phenol resin | | 5.5 | 0.5 | 3.1 | 3.1 |
|  |  | Ratio of epoxy resin:phenol resin | | 1.8 | 30.0 | 4.0 | 4.0 |
|  | Hardening accelerator | Imidazole | | 0.3 | 0.3 | 0.3 | 0.3 |
|  |  | Dicyandiamide | | 0.0 | 0.0 | 0.0 | 0.0 |
|  |  | Organic acid hydrazide | | 0.0 | 0.0 | 0.0 | 0.0 |
|  | Extender pigment | Magnesium silicate | Mean particle size 7 μm | 23.2 | 23.2 | 18.0 | 28.0 |
|  |  | Talc | Mean particle size 7 μm | 0.0 | 0.0 | 0.0 | 0.0 |
|  | Antirust pigment | Aluminum tripolyphosphate | Mean particle size 1 μm | 5.6 | 5.6 | 5.6 | 5.6 |
|  |  | Magnesium phosphate | Mean particle size 1 μm | 0.0 | 0.0 | 0.0 | 0.0 |
|  |  | Non-leafing aluminum flake | Mean particle size 15 μm | 1.7 | 1.7 | 1.7 | 1.7 |
|  |  |  | Mean particle size 10 μm | 0.0 | 0.0 | 0.0 | 0.0 |
|  |  |  | Mean particle size 6 μm | 0.0 | 0.0 | 0.0 | 0.0 |
|  | Coloring pigment | Leafing aluminum flake | Mean particle size 15 μm | 0.0 | 0.0 | 0.0 | 0.0 |
|  |  | Titanium oxide | Mean particle size 0.3 μm | 0.0 | 0.0 | 0.0 | 0.0 |
|  | Solvent | Methylethylketone | | 53.7 | 53.7 | 58.9 | 48.9 |
|  |  | Butanol | | 0.0 | 0.0 | 0.0 | 0.0 |
|  | Baking temperature | | | 180° C., 20 min | | | |
| Viscosity | Type B viscosity (JIS K 5600 by rotational viscometer) | 6 rpm | | 31 | 35 | 125 | 156 |
|  |  | 60 rpm | | 22 | 28 | 28 | 37 |
|  | TI value (paintability) | | | 1.4 | 1.3 | 4.4 | 4.2 |
|  | Cup viscosity (Iwata cup No. 2) | | | 12.0 | 13.0 | 13.0 | 14.0 |
| Physical properties | Resistance (Insulating properties) | Volume | | $3.5 \times 10^{11}$ | Unevaluated due to unhardening | $1.9 \times 10^{13}$ | $2.8 \times 10^{13}$ |
|  |  | Surface (Adhesiveness) | | $2.0 \times 10^{11}$ | | $2.0 \times 10^{13}$ | $2.7 \times 10^{13}$ |
|  | Erichsen peeling diameter | | | 3.5 | | 2.4 | 3.4 |
|  | Pencil hardness | | | F | | F | F |
|  | SST hose ASSY (corrosion resistance) | Ordinary temperature (without scratch) | | 1250 | | 1000 | >1500 |
|  |  | Ordinary temperature (with scratch) | | 1000 | | 1000 | >1500 |
|  |  | Heat resistance temperature (without scratch, after 12 H at 250° C.) | | 1000 | | 750 | >1500 |

TABLE 4-continued

|  |  |  | Example 15 | Example 16 | Example 17 | Example 18 |
|---|---|---|---|---|---|---|
|  |  |  | Resin ratio | | Extender pigment | |
|  |  | MEK rubbing (hardenability) | excellent |  | excellent | excellent |
|  |  | Thermal weight decrease temperature TG (heat resistance) | 300° C. |  | 300° C. | 300° C. |
|  |  | Color difference ΔB (appearance) | 13.6 |  | 2.3 | 2.3 |
|  |  | Color difference ΔB (appearance) between 200° C. and 180° C. | 10.5 |  | 1.1 | 1.1 |
|  |  | Storage stability 40° C., 1 month | excellent |  | excellent | excellent |
| Performance deterioration item |  | Paintability | poor | poor | — | — |
|  |  | Insulating properties | poor | — | — | — |
|  |  | Adhesiveness | poor | — | — | poor |
|  | Corrosion resistance | Ordinary temperature (without scratch) | good | — | good | — |
|  |  | Ordinary temperature (with scratch) | good | — | good | — |
|  |  | Heat resistance temperature (without scratch, after 12 H at 250° C.) | good | — | good | — |
|  |  | Hardenability | — | poor | — | — |
|  |  | Heat resistance | — | — | — | — |
|  |  | Appearance | poor | — | — | — |
|  |  | Storage stability 40° C., 1 month | — | — | — | — |

TABLE 5

|  |  |  |  | Example 19 | Example 20 | Example 21 | Example 22 |
|---|---|---|---|---|---|---|---|
|  |  |  |  | Antirust pigment | | Hardening accelerator | |
| Coating component wt % | Resin |  | Bisphenol type epoxy resin | 12.4 | 12.4 | 12.4 | 12.4 |
|  |  |  | Resol type phenol resin | 3.1 | 3.1 | 3.1 | 3.1 |
|  |  |  | Ratio of epoxy resin:phenol resin | 4.0 | 4.0 | 4.0 | 4.0 |
|  | Hardening accelerator |  | Imidazole | 0.3 | 0.3 | 0.6 | 0.0 |
|  |  |  | Dicyandiamide | 0.0 | 0.0 | 0.0 | 0.0 |
|  |  |  | Organic acid hydrazide | 0.0 | 0.0 | 0.0 | 1.0 |
|  | Extender pigment | Magnesium silicate | Mean particle size 7 μm | 23.2 | 23.2 | 23.2 | 23.2 |
|  |  | Talc | Mean particle size 7 μm | 0.0 | 0.0 | 0.0 | 0.0 |
|  | Antirust pigment | Aluminum tripolyphosphate | Mean particle size 1 μm | 2.0 | 9.0 | 5.6 | 5.6 |
|  |  | Magnesium phosphate | Mean particle size 1 μm | 0.0 | 0.0 | 0.0 | 0.0 |
|  |  | Non-leafing aluminum flake | Mean particle size 15 μm | 1.7 | 1.7 | 1.7 | 1.7 |
|  |  |  | Mean particle size 10 μm | 0.0 | 0.0 | 0.0 | 0.0 |
|  |  |  | Mean particle size 6 μm | 0.0 | 0.0 | 0.0 | 0.0 |
|  | Coloring pigment | Leafing aluminum flake | Mean particle size 15 μm | 0.0 | 0.0 | 0.0 | 0.0 |
|  |  | Titanium oxide | Mean particle size 0.3 μm | 0.0 | 0.0 | 0.0 | 0.0 |
|  | Solvent |  | Methylethylketone | 57.3 | 50.3 | 53.4 | 53.0 |
|  |  |  | Butanol | 0.0 | 0.0 | 0.0 | 0.0 |
|  | Baking temperature |  |  | 180° C., 20 min | | | |
| Viscosity | Type B viscosity (JIS K 5600 by rotational viscometer) |  | 6 rpm | 135 | 152 | 138 | 138 |
|  |  |  | 60 rpm | 26 | 33 | 33 | 33 |
|  |  |  | TI value (paintability) | 4.2 | 4.2 | 4.1 | 4.1 |
|  |  |  | Cup viscosity (Iwata cup No. 2) | 13.0 | 14.0 | 13.0 | 13.0 |
| Physical properties | Resistance (Insulating properties) |  | Volume | $2.3 \times 10^{13}$ | $2.4 \times 10^{13}$ | Unevaluated due to storage instability (thickened) | $2.2 \times 10^{13}$ |
|  |  |  | Surface (Adhesiveness) | $2.4 \times 10^{13}$ | $2.5 \times 10^{13}$ |  | $2.5 \times 10^{13}$ |
|  | Erichsen peeling diameter |  |  | 2.3 | 3.4 |  | 2.5 |
|  | Pencil hardness |  |  | F | F |  | F |
|  | SST hose ASSY (corrosion resistance) |  | Ordinary temperature (without scratch) | 1000 | >1500 |  | >1500 |
|  |  |  | Ordinary temperature (with scratch) | 1000 | >1500 |  | >1500 |
|  |  |  | Heat resistance temperature (without scratch, after 12 H at 250° C.) | 750 | >1500 |  | >1500 |
|  |  |  | MEK rubbing (hardenability) | excellent | excellent |  | excellent |
|  |  |  | Thermal weight decrease temperature TG (heat resistance) | 300° C. | 300° C. |  | 300° C. |

TABLE 5-continued

|  |  |  | Example 19 | Example 20 | Example 21 | Example 22 |
|---|---|---|---|---|---|---|
|  |  |  | Antirust pigment | | Hardening accelerator | |
|  |  | Color difference ΔB (appearance) | 2.3 | 2.3 |  | 4.8 |
|  |  | Color difference ΔB (appearance) between 200° C. and 180° C. | 1.1 | 1.1 |  | 2.2 |
|  |  | Storage stability 40° C., 1 month | excellent | excellent |  | excellent |
| Performance deterioration item |  | Paintability | — | — | — | — |
|  |  | Insulating properties | — | — | — | — |
|  |  | Adhesiveness | — | poor | — | — |
|  | Corrosion resistance | Ordinary temperature (without scratch) | good | — | — | — |
|  |  | Ordinary temperature (with scratch) | good | — | — | — |
|  |  | Heat resistance temperature (without scratch, after 12 H at 250° C.) | good | — | — | — |
|  |  | Hardenability | — | — | — | — |
|  |  | Heat resistance | — | — | — | — |
|  |  | Appearance | — | — | — | good |
|  |  | Storage stability 40° C., 1 month | — | — | poor | — |

As indicated in the performance deterioration items in Table 1 to Table 5, in Examples, the rustproof metal members in which corrosion resistance (including insulating properties) after application was excellent and the coating film had excellent durability (adhesiveness, hardenability, heat resistance) and appearance were successfully obtained within the scope of the present invention, although the particle size and blending amount of the non-leafing aluminum flakes, the pigment used in combination, and the like were changed.

Meanwhile, in Comparative Example 1 in which leafing aluminum flakes were blended in place of non-leafing aluminum flakes, the aluminum flakes aggregated, separated, and floated, and were not dispersed before the storage stability test, and thus a normal coating test was not conducted. In Comparative Example 2 in which titanium oxide was blended in place of non-leafing aluminum flakes, adhesiveness and corrosion resistance were poor, and, needless to say, color difference was poor.

When the blending amount of the non-leafing aluminum flakes was excessively small as compared with a normal blending amount, the corrosion resistance was poor, and the appearance deteriorated to such a degree that chipping was visible due to the color difference from the underlying layer as in Example 12. When the blending amount of the non-leafing aluminum flakes was excessively large as compared with a normal blending amount, the appearance was not problematic, but the corrosion resistance deteriorated due to resistance being too low, and the adhesiveness also deteriorated as in Example 13.

In Example 14, the baking temperature was changed, indicating that appearance was influenced by browning of resin unless a baking temperature selected depending on the resin to be used was used. In Examples 15, 16, the blending ratio between the epoxy resin and the resol type phenol resin was changed. In Example 15, the paintability was poor due to a TI value being too low, and influence of the low resistance on the corrosion resistance was observed. In Example 16, since the hardenability was poor since an amount of the resol type phenol resin was too small, sufficient hardening was not achieved, and other physical properties were not measured.

In Example 17, a too small blending amount of the extender pigment negatively affected the corrosion resistance. In Example 18, a too large blending amount of the extender pigment negatively affected the adhesiveness. Similarly, in Example 19, a too small amount of the antirust pigment negatively affected the corrosion resistance, and, in Example 20, a too large amount of the antirust pigment negatively affected the adhesiveness. Further, in Example 21, thickening occurred due to a too large amount of the hardening accelerator, and a normal coating test was not conducted. Further, in Example 22 in which the kind and the amount of the hardening accelerator were changed, the color difference was poor.

Although each of Examples 12 to 22 was within the scopes of claims 1 to 4, 6, 8, 9, 12 to 14, 16, 18, 19 of the present application, some of Examples 12 to 22 were outside any one of the best modes of the present invention recited in claims 5, 7, 10, 11, 15, 17, 20 and the description. Sufficiently usable paints and anticorrosive members as those in Examples 1 to 11 are likely to be obtained by modification while maintaining the features cited in claims 1 to 4, 6, 8, 9, 12 to 14, 16, 18, 19 even outside the scope of the best modes. Some of Examples 12 to 22 are to be actually support or reference for Examples of the present application.

According to the present invention, use of non-leafing aluminum flakes having large particle sizes as an antirust pigment improves the antirust performance. The reason is considered to be as follows.

FIG. 2 schematically illustrates the action of the coating film in the rustproof metal member of the present invention. As shown in FIG. 2, in the coating film 4 of the rustproof metal member 1, a defect 6 in the form of a through-hole is sometimes generated. The defect 6 is caused by chipping, cracking, during use of the rustproof metal member 1 or by the path through which the organic solvent in the coating paint evaporates. Therefore, generation of the defect 6 is an unavoidable phenomenon. Entry of water 5 into the defect 6 generated in the coating film 4 (and the zinc composite film 3 in some cases) causes ionization of zinc contained in the zinc composite film 3 to result in sacrificial corrosion. In the rustproof metal member 1 according to the present invention, the antirust effect of zinc inhibits generation of rust in the metal member 2. If water continues to enter the defect for a long time in a rustproof metal member which is not the present invention, zinc located directly under or in the vicinity of the defect in the zinc composite film is fully ionized. In this case, the sacrificial anticorrosive effect by the zinc is lost, and rust (red rust in the case of a steel metal member, and the like) is generated in the metal member. Meanwhile, at this time, zinc that is not exposed by the defect 6 and separated from the defect 6 in the zinc composite film 3 is not ionized and is left in general. Although not illustrated in detail, the coating film 4 surface other than the defect 6 is also supplied with the water 5 from the outside. Therefore, the antirust effect of zinc is considered to be maintained for a long time by supplying the zinc separated from the defect 6 with the water 5 to ionize the zinc.

Zinc 30 that is present near the surface on the coating film 4 side in the zinc composite film 3 is zinc that contributes to the sacrificial corrosion, and zinc 31 that is apart from the surface inside the zinc composite film 3 is zinc that has not contributed to the sacrificial corrosion yet due to delayed reach of the water 5.

In order to supply the water 5 to the zinc apart from the defect 6 in the zinc composite film 3, a path for the water 5 is formed in the coating film 4. In the coating film 4, a slight clearance is generated in the interface between a non-leafing aluminum flake 40 and a resin material 41, in the interface between another antirust pigment 42 and the resin material 41, and in the interface between an extender pigment 43 and the resin material 41. Therefore, these interfaces are considered to be utilized as paths for the water 5. The surface areas of the other antirust pigment 42 and the extender pigment 43 are much smaller than the surface area of the non-leafing aluminum flake 40. Therefore, the path of the water 5 in the coating film 4 is considered to be mainly formed by the interface (hereinafter, called a path interface) between the non-leafing aluminum flake 40 and the resin material 41.

The non-leafing aluminum flake 40 has a long axis that is larger than the thickness of the coating in one-time application of the coating paint. Therefore, when the coating film is formed by one-time application of the coating paint, the non-leafing aluminum flake 40 highly possibly penetrates the coating film in the thickness direction. Even in a coating film formed by two-time applications of the coating paint, the non-leafing aluminum flake 40 having been dried and immobilized while projecting from the coating by the first application is adjacent to or in contact with the non-leafing aluminum flake 40 of the second layer in the next application, and thus the non-leafing aluminum flake 40 is considered to penetrate the coating film formed by substantially two-time applications in the thickness direction. Alternatively, a path interface equivalent to the path interface formed by the one-time application is considered to be generated by the interface between the coating of the first layer and the coating of the second layer. Therefore, when the non-leafing aluminum flake 40 has such a mean particle size (long axis) that is larger than the thickness of the coating in one-time application of the coating paint and allows penetration through the coating formed by the one-time application in the thickness direction, the possibility of connection between the path interfaces and the possibility of penetration of the path interface through the coating film 4 in the thickness direction increase. Hereinafter, among the path interfaces, a path interface that penetrates the coating film 4 in the thickness direction is particularly called a penetrating interface (indicated by a white arrow in FIG. 2).

The larger the number of penetrating interfaces, the higher the possibility that a sufficient amount of the water 5 is supplied to zinc separated from the defect 6 in the zinc composite film 3. In other words, by using the non-leafing aluminum flakes 40, many penetrating interfaces are formed, and zinc in the zinc composite film 3 is used without waste, and thus the antirust performance of the rustproof metal member 1 is improved.

The rustproofed metal member of the present invention has one or a plurality of the following features (1) to (10).

(1) The aluminum flakes having been subjected to no leafing process have a mean particle size D50 of more than or equal to ½ of an average thickness of the coating film.

(2) The aluminum flakes having been subjected to no leafing process have a mean particle size D50 ranging from 6 to 22 μm.

(3) The coating film contains aluminum flakes that have been subjected to no leafing process and are immobilized by drying so as to penetrate the coating film in a thickness direction.

(4) The aluminum flakes having been subjected to no leafing process are contained in an amount of 2.0 to 10% by mass relative to 100% by mass of the coating film.

(5) The resin material is at least one selected from an epoxy resin, a phenol resin, and an acryl resin.

(6) As the resin material, the epoxy resin and a resol type phenol resin as the phenol resin are contained at a mass ratio of 12:1 to 2:1.

(7) The coating paint further includes an imidazole-based hardening accelerator.

(8) The organic solvent is at least one selected from:
  at least one aromatic solvent selected from toluene, xylene, ethylbenzene, and phenol;
  at least one alcohol-based solvent selected from ethyleneglycol monobutylether, butanol, ethanol, and methanol; and
  at least one ketone-based solvent selected from methylethylketone and methylbutylketone.

(9) The coating film contains 24 to 40% by mass of the resin material, 2 to 10% by mass of the aluminum flakes having been subjected to no leafing process, 5 to 18% by mass of an antirust pigment other than the aluminum flakes having been subjected to no leafing process, and 30 to 57% by mass of the extender pigment, relative to 100% by mass of the coating film.

(10) The coating film has a pencil hardness of F to B.

The coating paint of the present invention has one or a plurality of the following features (11) to (18).

(11) The aluminum flakes having been subjected to no leafing process have a mean particle size D50 of more than or equal to ½ of an average thickness of the coating film to be formed.

(12) The aluminum flakes having been subjected to no leafing process have a mean particle size D50 ranging from 6 to 22 μm.

(13) The aluminum flakes having been subjected to no leafing process are contained in an amount of 2 to 10 parts by mass, relative to 100 parts by mass of a dry solid content of the coating paint.

(14) The resin material is at least one selected from an epoxy resin, a phenol resin, and an acryl resin.

(15) As the resin material, the epoxy resin and a resol type phenol resin as the phenol resin are contained at a mass ratio of 12:1 to 2:1.

(16) An imidazole-based hardening accelerator is further included.

(17) The organic solvent is at least one selected from:
  at least one aromatic solvent selected from toluene, xylene, ethylbenzene, and phenol;
  at least one alcohol-based solvent selected from ethyleneglycol monobutylether, butanol, ethanol, and methanol; and
  at least one ketone-based solvent selected from methylethylketone and methylbutylketone.

(18) 24 to 40 parts by mass of the resin material, 2 to 10 parts by mass of the aluminum flakes having been subjected to no leafing process, 5 to 18 parts by mass of an antirust pigment other than the aluminum flakes having been subjected to no leafing process, and 30 to 57 parts by mass of the extender pigment are contained, and an organic solvent in an amount suited for application is further contained.

DESCRIPTION OF REFERENCE CHARACTERS

1: Rustproof metal member
2: Metal member
3: Zinc composite film
30: Zinc contributing to sacrificial corrosion (dotted line)
31: Zinc not contributing to sacrificial corrosion due to failure of reach of water (solid line)
4: Coating film
40: Non-leafing aluminum flake
41: Resin material
42: Antirust pigment other than non-leafing aluminum flakes
43: Extender pigment
5: Water
6: Defect in coating film

The invention claimed is:

1. A rustproofed metal member comprising:
a metal member having a predetermined shape,
a zinc composite film formed on a surface of the metal member, and
a coating film formed by applying and drying a coating paint on the zinc composite film,
wherein the coating paint comprises a coating base comprising an organic solvent and a resin material dissolved in the organic solvent, an imidazole-based hardening accelerator and an extender pigment and an antirust pigment dispersed and retained in the organic solvent and the resin material, and
wherein
the antirust pigment comprises aluminum flakes having been subjected to no leafing process,
the aluminum flakes having been subjected to no leafing process have a mean particle size D50 of from 6 to 15 μm,
the coating film comprises the aluminum flakes having been subjected to no leafing process in an amount of 2.0 to 10% by mass relative to 100% by mass of the coating film,
the aluminum flakes that have been subjected to no leafing process being immobilized by drying so as to penetrate the coating film in a thickness direction, and
a color difference Δ(delta) B between the coating film and the zinc composite film is equal to or less than 10 degrees.

2. The rustproofed metal member of claim 1, wherein the aluminum flakes having been subjected to no leafing process have a mean particle size D50 of greater than or equal to ½ of an average thickness of the coating film.

3. The rustproofed metal member of claim 1, wherein the resin material comprises at least one selected from the group consisting of an epoxy resin, a phenol resin, and an acryl resin.

4. The rustproofed metal member of claim 3, wherein the resin material comprises an epoxy resin and a phenol resin at a mass ratio of 12:1 to 2:1, and
wherein the phenol resin is a resol type phenol resin.

5. The rustproofed metal member of claim 1, wherein the organic solvent is at least one selected from the group consisting of: toluene, xylene, ethylbenzene, phenol, ethyleneglycol monobutylether, butanol, ethanol, methanol, methylethylketone, and methylbutylketone.

6. The rustproofed metal member of claim 1, wherein the coating film comprises
24 to 40% by mass of the resin material,
2 to 10% by mass of the aluminum flakes having been subjected to no leafing process,
5 to 18% by mass of an antirust pigment other than the aluminum flakes having been subjected to no leafing process, and
30 to 57% by mass of the extender pigment, relative to 100% by mass of the coating film.

7. The rustproofed metal member of claim 1, wherein the coating film has a pencil hardness of F to B.

8. The rustproofed metal member of claim 1, wherein the coating film comprises the aluminum flakes having been subjected to no leafing process in an amount of 2.0 to 9% by mass relative to 100% by mass of the coating film.

9. The rustproofed metal member of claim 1, wherein the coating film comprises the aluminum flakes having been subjected to no leafing process in an amount of 2.0 to 7% by mass relative to 100% by mass of the coating film.

10. A coating film formed from a coating paint for rustproofing, the coating paint comprising:
a coating base comprising an organic solvent and a resin material dissolved in the organic solvent, an imidazole-based hardening accelerator, and
an extender pigment and an antirust pigment dispersed and retained in the coating base,
wherein the antirust pigment comprises aluminum flakes having been subjected to no leafing process arranged in random directions in the coating paint without being affected by orientation effect on the coating surface due to a surface tension,
the aluminum flakes having been subjected to no leafing process have a mean particle size D50 of greater than or equal to an average thickness of the coating film formed per one application,
the aluminum flakes having been subjected to no leafing process have a mean particle size D50 of 6 to 15 μm,
the aluminum flakes having been subjected to no leafing process in an amount of 1.0 to 4.5 parts by mass, relative to 100 parts by mass of the coating paint,
wherein the coating paint is applied and dried on a zinc composite film to form a coating film, and
a color difference Δ(delta) B between the coating film and the zinc composite film is equal to or less than 10 degrees.

11. The coating paint of claim 10, comprising the aluminum flakes having been subjected to no leafing process in an amount of 2 to 10 parts by mass, relative to 100 parts by mass of a dry solid content of the coating paint.

12. The coating paint of claim 10, wherein the resin material comprises at least one selected from the group consisting of an epoxy resin, a phenol resin, and an acryl resin.

13. The coating paint of claim 12, wherein the resin material comprises an epoxy resin and a phenol resin at a mass ratio of 12:1 to 2:1, wherein the phenol resin is a resol type phenol resin.

14. The coating paint of claim 10, wherein the organic solvent is at least one selected from the group consisting of: toluene, xylene, ethylbenzene, phenol, ethyleneglycol monobutylether, butanol, ethanol, methanol, methylethylketone, and methylbutylketone.

15. The coating paint of claim 10, comprising:

24 to 40 parts by mass of the resin material, 2 to 10 parts by mass of the aluminum flakes having been subjected to no leafing process, 5 to 18 parts by mass of an antirust pigment other than the aluminum flakes having been subjected to no leafing process, 30 to 57 parts by mass of the extender pigment, each relative to 100 parts by mass of a dry solid content of the coating paint, and an organic solvent in an amount suited for application.

16. The coating paint of claim 10, wherein the aluminum flakes having been subjected to no leafing process in an amount of 1.0 to 4.0 parts by mass, relative to 100 parts by mass of the coating paint.

17. The coating paint of claim 10, wherein the aluminum flakes having been subjected to no leafing process in an amount of 1.0 to 3.0 parts by mass, relative to 100 parts by mass of the coating paint.

18. A coating film formed from a coating paint for rustproofing, the coating paint comprising:

a coating base comprising an organic solvent and a resin material dissolved in the organic solvent, an imidazole-based hardening accelerator and an extender pigment and an antirust pigment dispersed and retained in the coating base, wherein the antirust pigment comprises aluminum flakes having been subjected to no leafing process arranged in random directions in the coating paint without being affected by orientation effect on the coating surface due to a surface tension, the aluminum flakes having been subjected to no leafing process have a mean particle size D50 of greater than or equal to ½ of an average thickness of the coating film to be formed, the aluminum flakes having been subjected to no leafing process have a mean particle size D50 of from 6 to 15 µm, the aluminum flakes having been subjected to no leafing process in an amount of 1.0 to 4.5 parts by mass, relative to 100 parts by mass of the coating paint, wherein the coating paint is applied and dried at least two times on a zinc composite film to form a coating film, and a color difference Δ(delta) B between the coating film and the zinc composite film is equal to or less than 10 degrees.

* * * * *